United States Patent
Sai et al.

(10) Patent No.: US 7,532,424 B2
(45) Date of Patent: May 12, 2009

(54) METHOD OF WRITING PATTERN ON MEDIA AND DATA STORAGE DEVICE

(75) Inventors: Fuminori Sai, Kanagawa (JP); Kohji Takasaki, Kanagawa (JP); Masahiro Shohda, Kanagawa (JP); Hiroshi Yanagisawa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 260 days.

(21) Appl. No.: 11/494,684

(22) Filed: Jul. 26, 2006

(65) Prior Publication Data

US 2007/0025007 A1    Feb. 1, 2007

(30) Foreign Application Priority Data

Aug. 1, 2005    (JP) ............................. 2005-223332

(51) Int. Cl.
  *G11B 20/10*    (2006.01)
  *G11B 21/02*    (2006.01)
(52) U.S. Cl. .......................................... 360/51; 360/75
(58) Field of Classification Search ........................ None
  See application file for complete search history.

(56) References Cited

U.S. PATENT DOCUMENTS

| | | | |
|---|---|---|---|
| 5,612,833 A | | 3/1997 | Yarmchuk et al. |
| 5,790,332 A * | | 8/1998 | Bucska ......................... 360/51 |
| 5,901,003 A | | 5/1999 | Chainer et al. |
| 6,307,697 B1 * | | 10/2001 | Chainer et al. ................. 360/51 |
| 6,324,027 B1 * | | 11/2001 | Chainer et al. ................. 360/51 |
| 6,429,989 B1 * | | 8/2002 | Schultz et al. ................. 360/51 |
| 6,600,620 B1 * | | 7/2003 | Krounbi et al. ................ 360/51 |
| 6,633,451 B1 * | | 10/2003 | Chainer et al. ................. 360/75 |
| 6,735,031 B2 | | 5/2004 | Chainer et al. |
| 6,785,075 B2 * | | 8/2004 | Bryant et al. .................. 360/51 |
| 7,019,933 B2 * | | 3/2006 | Iseri et al. ..................... 360/51 |
| 7,136,243 B2 * | | 11/2006 | Chainer et al. ................ 360/51 |
| 7,268,963 B2 * | | 9/2007 | Chainer et al. ................ 360/51 |
| 7,342,735 B2 * | | 3/2008 | Hashimoto et al. ............ 360/51 |
| 2006/0056099 A1 * | | 3/2006 | Hashimoto et al. ............ 360/51 |

* cited by examiner

*Primary Examiner*—Hoa T Nguyen
*Assistant Examiner*—James L Habermehl
(74) *Attorney, Agent, or Firm*—Townsend and Townsend and Crew LLP; Patrick Duncan

(57) ABSTRACT

Embodiments of the invention reduce the effect of the rotational jitters to write a pattern in more accurate timing in self-writing a pattern on a magnetic disk. In an embodiment of the invention, respective patterns in N sectors are first written on an inner circumferential side track as reference patterns with a default clock frequency and a default clock number (a writing interval clock number between respective patterns). The respective reference patterns are then read out plural times for measuring intervals thereof to determine an average value of intervals between the respective sectors. Using the value, a target value is calculated in each sector, which is used in wiring new patterns on the outer circumferential side at even intervals. Then, the respective reference patterns on the inner circumferential side track are read out while the new patterns are written on the outer circumferential side. The respective outer circumferential side patterns are written with the modulated clock frequency after a delay time calculated for every sector has passed from the time when the reference patterns on the inner circumferential side track are detected.

20 Claims, 6 Drawing Sheets (a)

(b)

METHOD OF WRITING PATTERN ON MEDIA AND DATA STORAGE DEVICE

CROSS-REFERENCES TO RELATED APPLICATIONS

This application claims priority from Japanese Patent Application No. JP2005-223332, filed Aug. 1, 2005, the entire disclosure of which is incorporated herein by reference.

BACKGROUND OF THE INVENTION

The invention is related to a method of writing a pattern on a media and a data storage device, particularly, control of timing in writing a pattern on a rotating media.

A device using various kinds of medium such as an optical disk and a magnetic tape as a data storage device is known. Among such devices, a hard disk drive (HDD) is widely used as a storage device of a computer and is an essential device in a current computer system. Furthermore, the excellent characteristics of HDD have increased the area of the usage of the HDD not only in a computer system but also in a removable memory used in a moving picture image recording/playing device, a car navigation system, a cellular phone, a digital camera or the like.

A magnetic disk used in an HDD has plural tracks formed into the shape of concentric circles. In the respective tracks, both servo data and user data are written. Accessing to a desired area (address) by a head device fabricated by a thin-film process in accordance with the servo data enables data writing or data reading to be performed. In the data reading process, a signal read from the magnetic disk by means of the head device undergoes a signal process such as waveform shaping or decoding in a signal processing circuit to be sent to a host. Data transmitted from the host similarly undergo a process in a signal processing circuit, and then, written in the magnetic disk.

As described above, the respective tracks comprise a user data area for storing the user data and a servo pattern area for storing the servo data. The servo pattern (referred to as a product servo pattern in this disclosure) comprises a cylinder ID, a sector number, a burst pattern and the like. The cylinder ID indicates an address of a track. The sector number indicates a sector address in a track. The burst pattern includes relative location information of a magnetic head to a track.

The product servo pattern consists of plural sectors separated in a circumferential direction in the respective tracks. Locations (phases) of the product servo pattern in the respective sectors coincide with each other in the circumferential direction over the whole tracks. Data are read from or written on the magnetic disk during rotation of the magnetic disk, confirming a location of the magnetic head on the basis of the servo data.

The product servo pattern is written on a magnetic disk in a factory before shipping of an HDD as a product. Conventionally, the product servo pattern has been typically written by means of a servo writer, which is an external device. An HDD is set in the servo writer, which positions a head in the HDD by means of a positioner (an external positioning mechanism), to write a product servo pattern generated in a product servo pattern generation circuit on a magnetic disk.

The cost of STW (servo track write) occupies a significant portion in the present manufacturing process of HDD. Recently, there has been a keen competition in HDD technologies to achieve high density, which causes an increase in TPI (track per inch), which results in the increase in the number of tracks and the reduction of the width of tracks (a track pitch). This causes significant increase in STW time and in precision of a servo writer, and thereby, in the cost of STW. In order to reduce the cost of STW, reduction of cost of the servo writer and STW time is extremely important.

In this context, SSW (self servo write) has been proposed as a new method to write servo patterns. The SSW is different from the conventional STW in that only a mechanism part of a main body of an HDD is used and a spindle motor (SPM) and a voice coil motor (VCM) in the HDD are controlled by means of an external circuit to write a product servo pattern by means of the external circuit. This contributes to the reduction in cost of a servo writer.

As a method of SSW, known is a method in which a pattern having been written on an inner radial side or an outer radial side is read by means of a read device to perform positioning of the head, taking advantage of a difference in location in a radial direction between the read device and a write device of the head device (refereed to as a read/write offset), while a new pattern is written on a desired track provided separately by the read/write offset by means of the write device.

In the SSW, locations of the respective product servo patterns should precisely coincide with the adjacent servo tracks in the circumferential direction. Because the product servo patterns are written so as to be partially overlapped between the adjacent servo tracks, signals from the adjacently written patterns are not well superimposed in the case where the phases in the circumferential direction do not coincide with each other, which results in problems such as reduction in the read amplitude of the pattern. Further, in view of simplicity of the control, the respective patterns are preferably written in the circumferential direction at even intervals.

Accordingly, in the SSW, precise control of locations in the circumferential direction, that is, timing for writing is required in writing a product servo pattern or another pattern, which is a reference to the product servo pattern. There has been a known technology in which the intervals between written patterns are used for correcting timing for writing in order to control intervals of patterns in a circumferential direction in propagation of a timing pattern in self servo writing. See, e.g., JP-A-8-212733.

BRIEF SUMMARY OF THE INVENTION

In order to precisely write plural patterns on a track using a certain fixed clock frequency, it is necessary to perform precise control of an SPM to precisely maintain the rotational speed of the SPM. In the case of writing plural patterns at even intervals, for example, the respective patterns should be written at even intervals with a fixed clock frequency and a fixed number of clock count while the rotational speed of the SPM is precisely maintained. Generally, a dedicated external servo writer may achieve such precise control of rotation of the SPM, and thereby, pattern writing at precisely even intervals.

Unlike the case of conventional SSW using a dedicated servo-writer, it is possible to use the intrinsic circuit of an HDD to self-write a servo pattern on a magnetic disk. Self-complete execution of self-writing of a servo pattern by the intrinsic circuit of an HDD makes a dedicated servo writer unnecessary, and this removes the requirement for a large investment to the equipment for servo write in the manufacturing.

However, in the case where an ordinal HDD carries out the SSW by its own mechanism and circuit as described above, it is difficult to precisely control rotation of an SPM unlike the case of using a dedicated external servo writer, and there exists a significant amount of jitter in rotational speed (rotational jitter) of a magnetic disk. This causes unequal pattern intervals in the written patterns on the magnetic disk using a certain fixed clock, and the patterns cannot be written on a same track at equal intervals or a difference in phase occurs between patterns of adjacent tracks.

A feature of this invention is to compensate for the effect of rotational jitters of a media in self-pattern writing to write a new pattern in more accurate timing.

The first example of this invention is a method of reading a pattern by means of a read device associated with writing a new pattern by means of a write device placed at a different radial location in a rotating media, the method comprising the steps of: writing plural reference patterns on a first track of the rotating media; measuring plural times a read time value of each of the plural reference patterns to determine a target time value corresponding to the read time value of the reference pattern; reading the plural reference patterns simultaneously with changing clock frequency based on a difference between the read time value of each of the respective reference patterns and the determined target time value; and reading the respective reference patterns to write a new pattern on a second track after a delay time obtained in prior to each sector with a modulated clock frequency. Executing plural times measurement of a read time value of each of the plural reference patterns to obtain a target time value by averaging the measured read time values enables one to compensate for the effect of rotational jitters of the media in measurement by changing the clock frequency in writing a new pattern on the basis of a target time value thus determined, which enables one to reduce the effect the rotational jitters in writing a pattern. This method enables pattern writing in more accurate timing. In time measurement and delay time setting with a clock having controlled frequency, included is a use of more precise time in which individual clock time is further minutely interpolated in an analog or digital method. This can be applied to the case in the following description.

The second example of this invention is the method according to the first example, wherein the clock frequency is changed by PID control based on a difference between the read time value of each of the respective reference pattern and the target value. The PID control enables more accurate control to be achieved.

The third example of this invention is the method according to the first example, wherein a read time value of each reference pattern obtained with compensating for the effect of rotating jitter of the media is calculated on the basis of the measured plural read time values of each reference pattern to determine the resulting read time value to be a target time value of the reference pattern. Determining a read time value of each of the reference patterns obtained by compensating for a rotational jitter component of the media to be a target value of the reference pattern enables one to reduce the effect of the rotational jitters of the media more effectively by this control.

The fourth example of this invention is the method according to the third example, wherein a simple average value of the measured plural read time values of each of the reference patterns is determined to be the target value. This enables a precise target value to be easily obtained.

The fifth example of this invention is the method according to the first example, wherein a value of the measuring clock frequency for carrying out the measurement of the plural reference patterns is a value that a total number of clock count for one revolution of a track with the clock frequency can be equally divided by the number of patterns written on the second track. This enables patterns to be precisely written on the second track at equal intervals.

The sixth example of this invention is the method according to the fifth example, wherein the measuring clock frequency is determined based on plural measured values of the total number of clock count for one revolution of the first track with the reference clock frequency and on the clock count number between the patterns written on the second track. This enables one to precisely determine the clock frequency regardless of the rotational jitters of the media.

The seventh example of this invention is the method according to the sixth example, wherein the reference clock frequency is the clock frequency with which the plural reference patterns on the first track are written. This minimizes the change in the clock frequency between writing of the reference pattern on the first track and writing of a new pattern on the second track.

The eighth example of this invention is a data storage device comprising: a read device for reading plural times each of plural reference patterns written on a first track in a rotating media; a controller for using plural read time values of each of the plural reference patterns, the values read by means of the read device, to determine a target time value corresponding to the read time values; a clock generation circuit for generating a clock having clock frequency controlled with a difference between the read time value of each of the reference patterns and the target time value thereof; and a write device to write a new pattern on a second track after a delay time obtained in prior to every sector with controlled clock frequency has passed during reading the respective reference patterns. This enables pattern writing in more accurate timing.

The ninth example of this invention is the clock generation circuit according to the eighth example, wherein the clock generation circuit changes the clock frequency by PID control based on a difference between the read time value of each of the respective reference patterns and the target time value. The PID control enables pattern writing in more accurate timing.

The tenth example of this invention is the controller according to the eighth example, wherein the controller calculates a read time value of each of the reference patterns obtained by compensating a rotating jitter component of the media on the basis of the plural read time values of each of the reference patterns, the plural read time values being read by means of the read device, to determine the resulting time value to be a target time value of the reference pattern. This enables one to reduce the effect of the rotational jitters of the media more effectively.

The eleventh example of this invention is the controller according to the eighth example, wherein the controller determines a simple average value of the plural read time values of each of the reference patterns, the plural read time values being read by means of the read device, to be the target time value. This enables a precise target time value to be easily obtained.

The twelfth example of this invention is the data storage device according to the tenth example, wherein a value of the measuring clock frequency for carrying out reading of the plural reference patterns by means of the read device is a value that a number of the clock count for one revolution of a track with the frequency is equally divided by the number of patterns written on the second track. This enables patterns to be precisely written on the second track at even intervals.

The thirteenth example of this invention is the controller according to the twelfth example, wherein the controller determines the clock frequency based on plural measured values of the number of the clock count for one revolution of the first track with the reference clock frequency and the clock count number between the patterns written on the second track. This one enables to precisely determine the clock frequency regardless of the rotational jitters of the media.

The fourteenth example of this invention is the reference clock frequency according to the thirteenth example, wherein the reference clock frequency is the clock frequency with which the plural reference patterns are written. This minimizes the change in clock frequency from writing of the reference pattern to writing of a new pattern.

In the above context, in time measurement and delay time calculation by a clock with controlled frequency in the examples, included is a use of more precise time in which individual clock time is further minutely interpolated in either an analog or digital method.

In accordance with the invention, in self-writing a pattern on a rotating media, effect of jitters in the rotation of the media may be reduced and patterns may be written in more accurate timing.

DETAILED DESCRIPTION OF THE INVENTION

Figure 1:
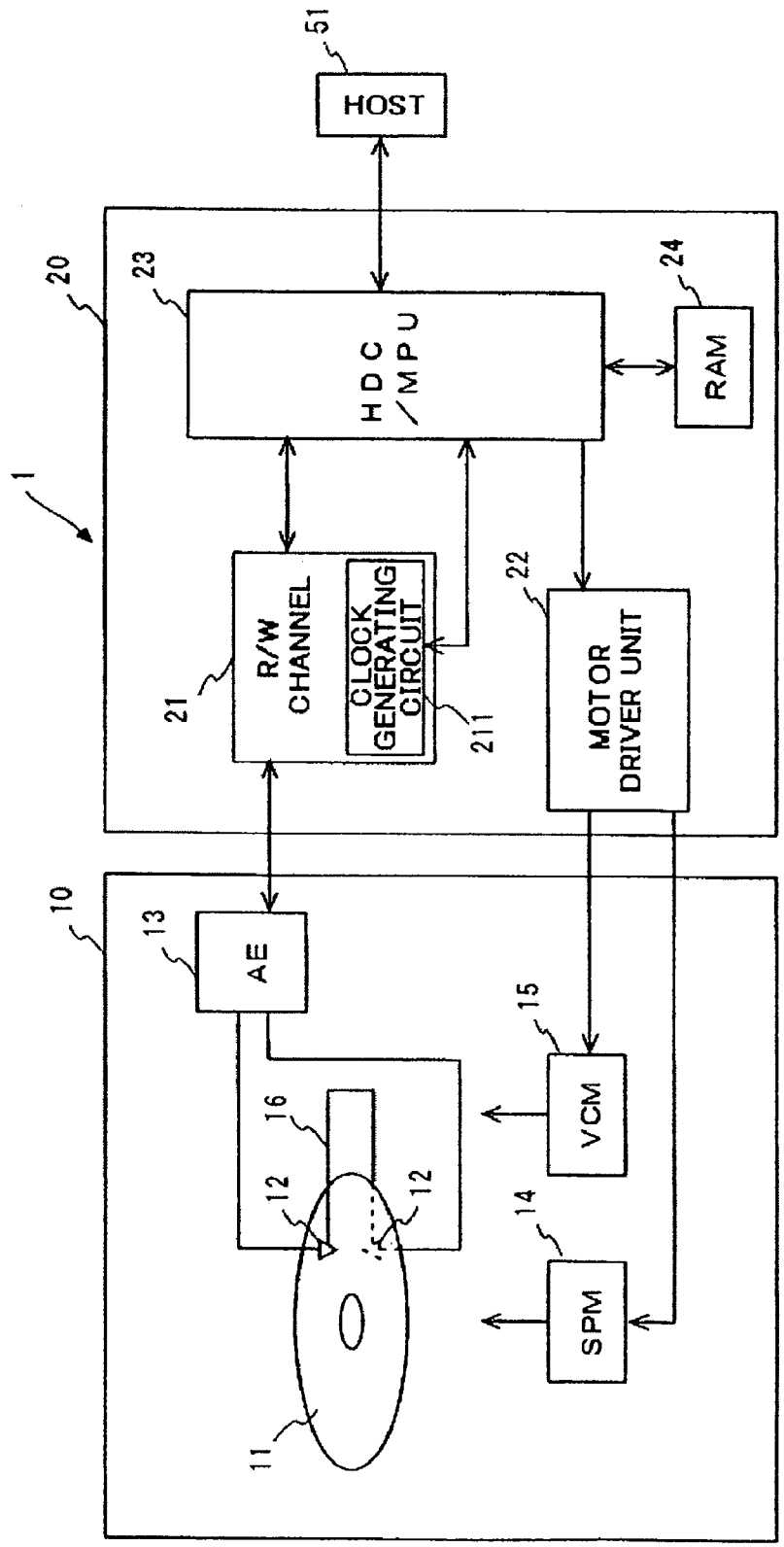
FIG. 1 is a block diagram schematically showing a whole structure of an HDD in an embodiment.

Specific embodiments of the invention will be described in detail hereinafter, with reference to the drawings. The following description and the drawings may be properly omitted or simplified for clarity of description. In the drawings, same elements are designated by the same reference numerals and signs and repeated description is omitted in order to simplify the description.

The embodiments are related to self-pattern-writing on a media in a data storage device, that is, a process of writing of a new pattern on the basis of self-written patterns on a media, particularly, control of timing for writing in self-pattern-writing. In the embodiments, a process of self-writing a servo pattern in a hard disk drive (HDD), which is an example of a data storage device, is explained to describe the example of the invention.

Self servo write (SSW) for writing a servo pattern by means of its own mechanism of an HDD has been known. In an HDD in a preferred embodiment, a function performed by an external circuit in the conventional SSW is built in the circuit on a product card (a card on which respective ICs and other components used for the control of HDD are mounted). This enables the HDD to carry out a process of self-writing a servo pattern on a magnetic disk substantially only with its own structure without directly depending on a servo writer device, which is an external device. The HDD responses to a start signal from an external control device to write a servo pattern on a magnetic disk in accordance with a function mounted on its own circuit.

An outline of a whole structure of the HDD performing the SSW in the embodiment will be provided before describing an SSW process in the embodiment. FIG. 1 is a block diagram schematically showing the structure of an HDD 1. The HDD 1 comprises in a fully enclosed enclosure 10, a magnetic disk 11, which is an embodiment of a media (a recording media), a head device part 12, an arm electronic circuit (arm electronics: AE) 13, a spindle motor (SPM) 14, a voice coil motor (VCM) 15 and an actuator 16.

The HDD 1 comprises a circuit board 20 fixed outside of the enclosure 10. The circuit board 20 is provided thereon with respective ICs such as a read/write channel (a R/W channel) 21, a motor driver unit 22, an integrated circuit of a hard disc controller (HDC) and an MPU (an HDC/MPU, hereinafter) 23 and a RAM 24. The respective circuits may be integrated into one IC or separately mounted to plural ICs.

The HDC/MPU 23 receives write data from an external host 51. The write data is then written on the magnetic disk 11, which is a nonvolatile recording media, through the R/W channel 21 and the AE 13 by means of the head device 12. The head device 12 reads the data stored in the magnetic disk 11. The read data is transferred from the HDC/MPU 23 to the external host 51 via the AE 13 and the R/W channel 21.

The magnetic disk 11 is fixed on the SPM 14. The SPM 14 rotates the magnetic disk 11 at a predetermined speed. The motor driver unit 22 drives the SPM 14 based on the control data from the HDC/MPU 23. The magnetic disk 11 in the embodiment includes recording surfaces for recording data on both side surfaces thereof and is provided with the head device 12 corresponding to the respective recording surfaces.

The respective head device 12 is located in a slider (not shown). The slider is mounted on the actuator 16. The actuator 16 is connected to the VCM 15 and rotated around the pivot axis to move the head device part 12 (and the slider) in the radius direction on the magnetic disk 11. The motor driver unit 22 drives the VCM 15 by the control data (DACOUT) from the HDC/MPU 23.

The head device 12 comprises a write device for converting an electric signal into a magnetic field correspondent to the data to be recorded in the magnetic disk 11 and a read device for converting a magnetic field from the magnetic disk 11 into an electric signal. This will be described later. The number of the magnetic disk 11 may be one or more. The recording surface may be formed on one surface or both surfaces of the magnetic disk 11.

The AE 13 selects one head device 12 for data access among plural head devices 12, and amplifies the read signal reproduced by means of the selected head device 12 at a fixed gain to send the amplified signal to the R/W channel 21. The AE 13 also sends a recording signal from the R/W channel 21 to the selected head device 12. In the SSW, the AE 13 transmits a servo signal read by the selected head device 12 to the R/W channel 21 while the AE 13 transmits write data from the R/W channel 21 (servo data, for example) to the selected head device 12.

The R/W channel 21 modulates the write data supplied from the HDC/MPU 23 into code, and then converts the write data modulated in code into a write signal and supplies it to the AE 13 in the writing process. On the other hand, in the reading process, the R/W channel 21 amplifies the read signal supplied from the AE 13 to a certain amplitude and picks up data from the obtained read signal to carry out a decoding process. The read data is transferred to the HDC/MPU 23.

The R/W channel 21 includes a clock generation circuit 211. Timing control in the SSW is performed in accordance with a clock signal generated in the clock generation circuit 211 of the R/W channel 21. Moreover, in the R/W channel 21 in the embodiment, the clock generation circuit 211 may change clock frequency (modulate frequency) based on the control signal calculated by the HDC/MPU 23. This will be described later.

In HDC/MPU 23, the MPU is operated by a micro-code loaded in the RAM 24. When the HDD 1 starts the operation, data necessary for controlling the HDD and for processing the data, in addition to micro-code used in the MPU, are loaded to the RAM 24 from the magnetic disk 11 or the ROM (not shown). The HDC/MPU 23 executes entire control of the HDD 1 as well as a necessary process regarding a data process including the control of the positioning of the head device 12 using the servo data and interface control with a host system. The SSW is executed under the control of the HDC/MPU 23.

Figure 2:
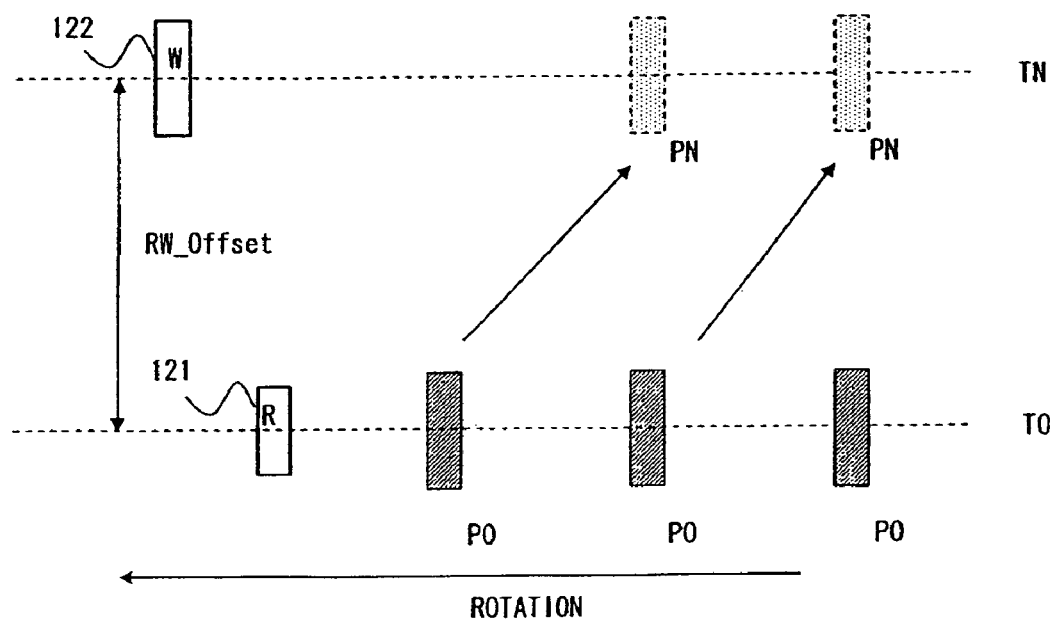
FIG. 2 schematically illustrates a method of SSW in an embodiment.

FIG. 2 schematically illustrates a method of the SSW. In the SSW, an original pattern (PO) written on an inner (ID) or outer (OD) circumferential side servo track (TO) is read by means of a read device 121 in the head device 12 while a new pattern (PN) is written by means of a write device 122, which is located at an outer or inner radial side servo track (TN), in the head device part 12. That is to say, the read device 121 follows a servo pattern in each sector of a reference track TO while the write device 122 writes a new servo pattern PN on the track TN in predetermined timing after detecting the respective sectors. Moving the head device 12 successively to the outer circumferential side or the inner circumferential side to advance writing of patterns enables servo patterns to be written all over the surface of the magnetic disk 11.

Further, FIG. 2 illustrates a relation between locations of the read device 121 and the write device 122. A read/write offset (RW-offset) is a distance in the radial direction between the read device 121 and the write device 122. To be concrete, it is a distance in the radial direction of the magnetic disk 11 between the respective centers of the read device 121 and the write device 122. The read/write offset is a function of the radial position of the head device 12. For the head device 12, it is possible to design the read/write offset to be in the same order in the radial direction at all track locations from the ID side to the OD side. This enables patterns written on the inner radial side to be read to carry out positioning of the head device 12, and therefore, a pattern may be written to a track on the most OD side.

As described above, the SSW is a method of referring a self-written pattern to perform time control (timing control in a circumferential direction) and space control (location control in a radial direction) based on time and space information obtained from a signal of the pattern associated with writing of a subsequent pattern at a location shifted by an amount of the read/write offset in the radial direction.

In the following description, the read device 121 is located at the inner radial (ID) side of the magnetic disk 11 than the write device 122. Writing patterns from the inner radial side enables patterns formerly written by means of the write device 122 to be read by means of the read device 121. This enables the write device 122 to write a new pattern during positioning of the head device 12 on the basis of the pattern read by means of the read device 121. It is also possible to change locations of the read/write devices 121/122 in terms of radial direction to start the SSW from the outer radial position in the magnetic disk 11.

The SSW comprises several sequences. A final servo pattern (a product servo pattern) ultimately used for reading/writing user data is written on all over the magnetic disk 11.

For the purpose of performing the writing these patterns, other than the case of writing product servo patterns based on previously written product servo patterns on the magnetic disk 11 (self-propagation of a product servo pattern), there may be a case where product servo patterns are written based on another type of patterns (combination of patterns dedicated for timing and for positioning, or partially modified patterns of product servo patterns) in an initial sequence. The following embodiment will describe on a process for writing new patterns at equally separated intervals using reference patterns at uneven intervals in an initial sequence.

In an initial sequence of the SSW process, an actuator 16 is pushed against a crash stop (not shown) to keep a location of the head device 12 in the radial direction stable so as to write initial patterns. The crash stop is a member for limiting movement of the actuator 16 in the radial direction by collision with the actuator 16. The crash stop is provided on both of the inner and outer circumferential sides with respect to the actuator 16. Typically, the crash stop is composed of soft resin. In order to change the location of the head device part 12 with the actuator 16 being pushed against the crash stop, adjusted is a value of electric current of the VCM 15.

In timing control in self-writing of patterns, also used is a function the HDD 1 originally has. The HDD 1 may use a servo address mark (SAM) in a product servo pattern or a data address mark (DAM) in a user data sector as a timing signal. To be concrete, the R/W channel 21 measures the time when the R/W channel 21 detects the SAM or DAM or measures a time from the preceding SAM or DAM. The measured value is generally transmitted to the HDC/MPU 23 to carry out calculation for clock frequency control on the basis of the measured value. In other embodiments, an SAM detection signal or a DAM detection signal may be outputted to the HDC/MPU 23 so that the HDC/MPU 23 would perform timing measurement of a pattern on the basis of the signal and calculation for clock frequency control using the measured timing value. The calculated result for clock frequency control is returned to the R/W channel 21 to carry out the control of the clock frequency.

Figure 3:
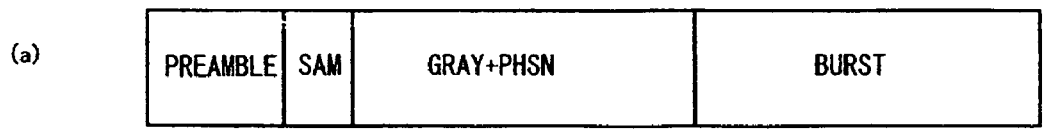
FIG. 3 illustrates typical data formats of servo data and a user data sector.
Figure 3:

As shown in FIG. 3(a), a servo pattern comprises a preamble (PREAMBLE), an SAM, a track ID formed as a gray code (GRAY), a servo sector number (PHYS) (optional) and burst patterns (BURST). The SAM indicates where actual information such as the track ID starts. The SAM signal, which is generally a timing signal appearing when the SAM is found, is accurately correlated with a location where the SAM pattern is written on the magnetic disk 11. The burst patterns (BURST) are the signals indicating a further precise location of a head in a track indicated by the track ID. In the embodiment, the burst pattern includes four amplitude signals A, B, C and D written on the respective tracks so as to be staggered with respect to each other in both radial and circumferential locations on the respective tracks so as to be arranged in the hound's-tooth configuration. Each of the burst patterns is a single frequency signal having a cycle same as that of the preamble (PREAMBLE).

In another case, the user data sector format typically comprises a preamble (PREAMBLE), a DAM, user data (USER DATA) and an ECC (error correction code) as shown in FIG. 3(b). The DAM is a mark indicating a start of the user data. The DAM signal is accurately correlated with the location of DAM pattern written on the magnetic disk 11, similarly to the SAM.

Servo sector intervals of product servo patterns are preferably even on a track. In the SSW, subsequent patterns are written based on patterns having been previously written, as described above. Accordingly, an interval of patterns written in an initial sequence is basically kept to the end as it is. Writing a pattern at even intervals on a track is thus required in the initial sequence.

In order to precisely write plural patterns on a track at even intervals, it is desirable to maintain the accurate rotational speed by precise control of the SPM 14 to write patterns at even intervals with a fixed clock under such a condition. A dedicated servo writer may accurately control rotation of the SPM 14. In the case where the HDD 1 performs the SSW with its own mechanism and electronics, however, such control just by using its intrinsic circuit is difficult, and the rotation speed fluctuates to a certain extent.

Figure 6:
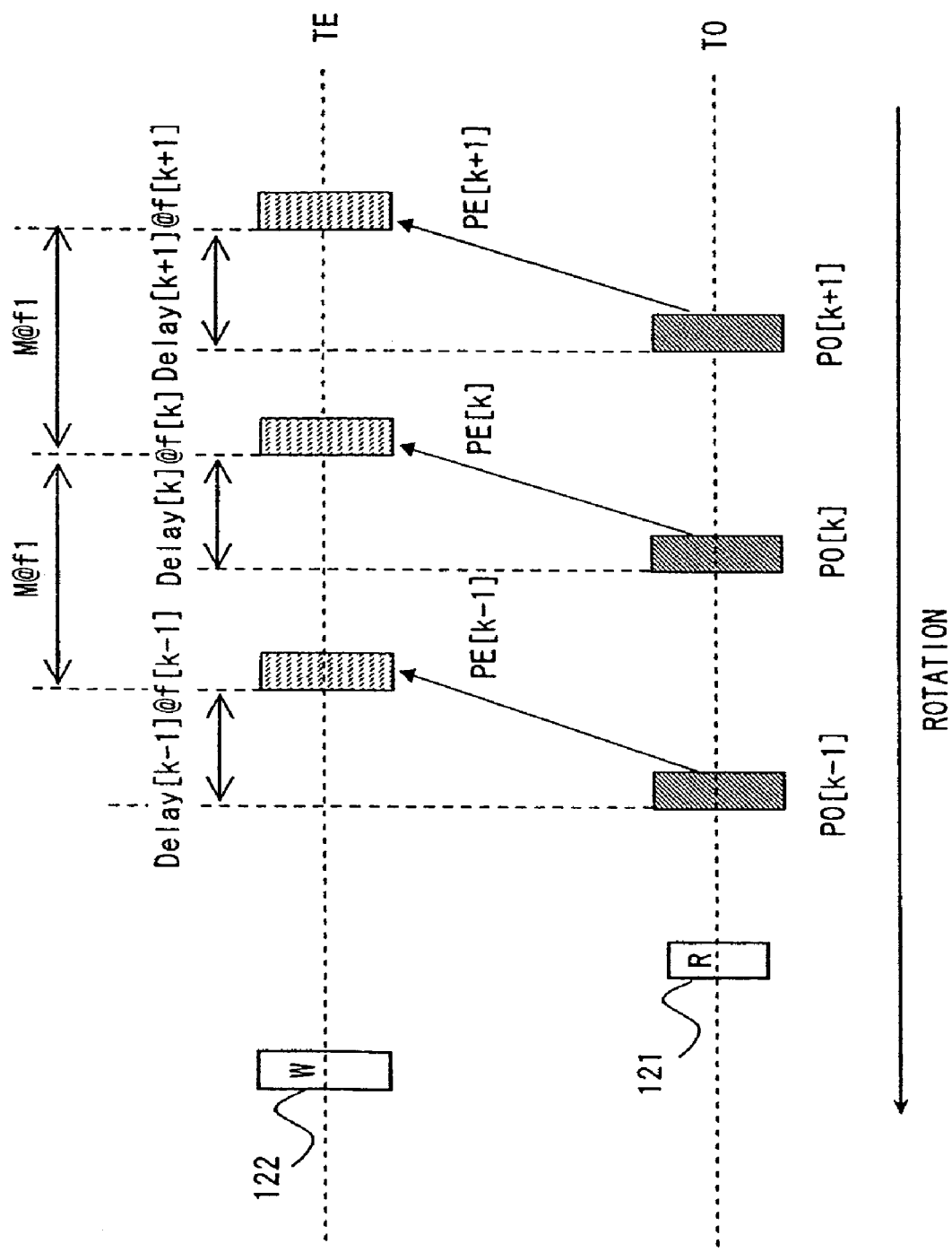
FIG. 6 illustrates how to perform clock frequency adjustment by PID control to write a set of new patterns on an outer radial side at even intervals on the basis of read inner radial side reference patterns in an embodiment.

In the present embodiment, disclosed is a method of writing initial patterns at even intervals in the SSW with the R/W channel 21 capable of adjusting the clock frequency. Concretely, patterns PE, whose intervals on the outer radial side meet an expected value (a target value), are written at even intervals using sector patterns PO of an inner radial side track written at uneven intervals as a reference, as shown in FIG. 6.

The respective patterns PE on the outer track are written in predetermined timing after detecting the respective reference patterns PO on the inner radial side track. More in detail, the outer radial side patterns PE are written after a delay time (Delay [k]) determined for each sector has passed from the time when the respective reference pattern PO is detected. At that time, the clock frequency (f[k]) is adjusted in each sector synchronously with rotational jitters of the SPM 14. The clock frequency is modulated in a method of PID control using a time difference between actual timing for reading the respective reference patterns on the inner radial track and the target time value.

Figure 4:
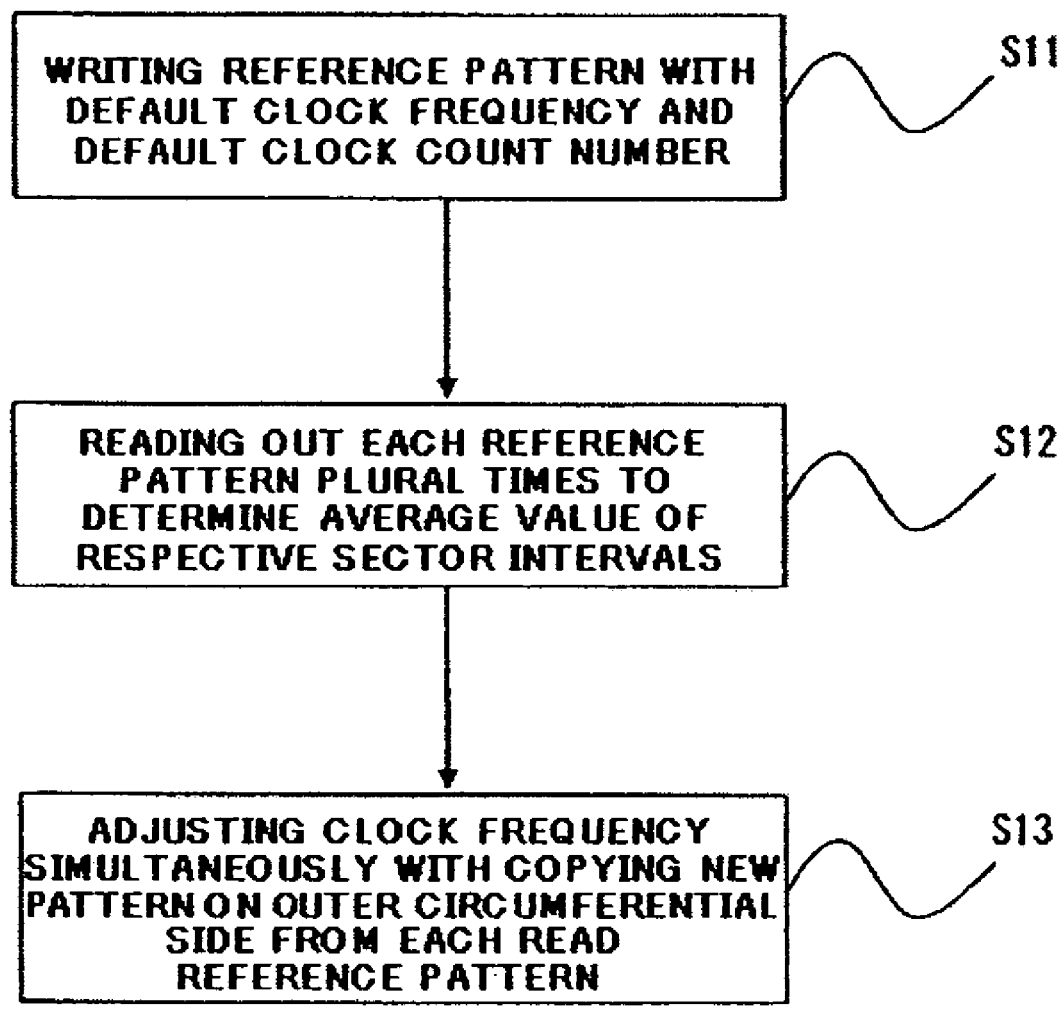
FIG. 4 is a flowchart showing a whole process of self-pattern-writing in an embodiment.

In the following explanation, each individual process will be described. The HDC/MPU 23 executes the following respective processes, using other components in HDD, and a whole process will be described with reference to a flowchart in FIG. 4. The respective patterns in N sectors are first written on the inner radial side track as reference patterns with the default clock frequency and a default clock count (a writing interval clock count between respective patterns) (S11).

Subsequent to the above described step, the read device b121 is moved to the inner radial side track to read the respective reference patterns plural times to obtain intervals thereof, and then, an average value of intervals between respective sectors are determined (S12). Using the obtained value, a target value is calculated in each sector, which is used in writing new patterns on the outer circumferential side at even intervals.

Then, the respective reference patterns on the inner radial side track are read while the new patterns are written on the outer radial side (S13). The respective outer radial side patterns are written with the modulated clock frequency after a delay time calculated for each sector has passed from the time when the reference patterns on the inner radial side track are detected. The clock frequency varies in accordance with the PID control using a time difference between the target time value and actual timing for reading the reference pattern, as described above.

Figure 5:
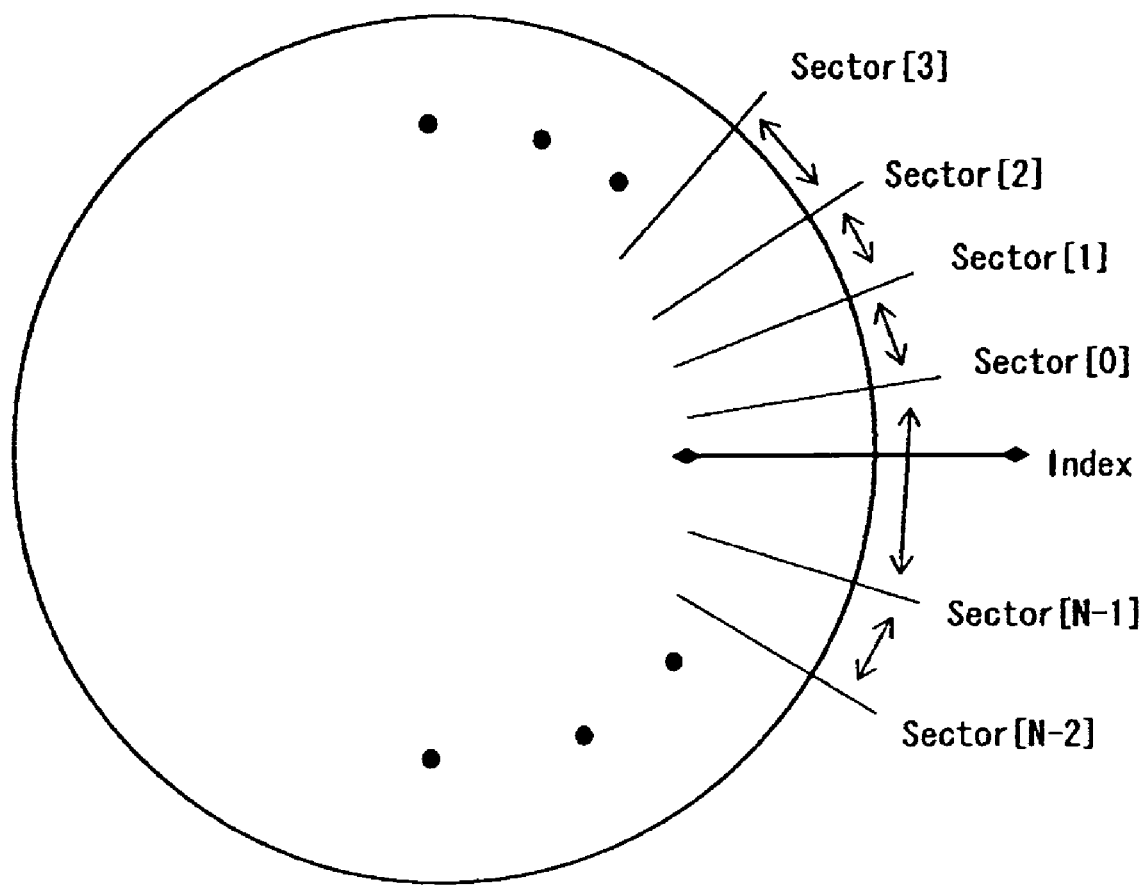
FIG. 5 illustrates a set of reference patterns written on an inner circumferential side track at uneven intervals in an embodiment.

The respective processes will be described more in detail. Patterns in N sectors are written on the inner circumferential side track in S11. As shown in FIG. 5, the respective patterns are written at default clock count intervals with optionally selected default clock frequency f0 counted from an index signal. The index is a signal generated by means of the motor driver unit 22 for driving the spindle motor 14 based on inverse electromotive force of the SPM 14. The index is generated in accordance with a rotational cycle of the SPM 14. The sectors of the respective patterns are numbered in order from the index. The respective patterns are basically in the identical format and include timing signal either in SAM or DAM pattern. This enables the HDC/MPU 23 to determine the timing for detecting the respective patterns.

An interval between the last written pattern Sector[N−1] and the first written pattern Sector[0] may be significantly different from intervals between other sectors. This is because the rotational speed of the SPM 14 may change bitter) during writing of N sector patterns. The sector intervals are almost identical to each other among (N−1) sectors except the one from Sector[N−1] to Sector[0]. The accumulation of the difference appears in the last sector interval, and the interval of (Sector[N−1]−Sector[0]) may significantly differ from other intervals. In the following steps, plural new patterns (N patterns) having even intervals between the respective sectors are written on the outer radial side track on the basis of the plural reference patterns whose sector intervals may not be even.

In S12, time intervals of PO are measured in multiple revolutions with a default clock frequency. There is no specific limitation in the selection of the default clock. For efficiency of the process, however, used is the clock frequency f0 used in first writing the pattern PO unevenly. By the configuration shown in FIG. 6, the HDC/MPU 23 positions the read device 121 on the inner radial side track TO to read the respective patterns PO, and further measures timing for reading the respective patterns PO to determine intervals between the respective patterns PO.

The HDC/MPU 23 repeated measurement of pattern intervals plural times to calculate a simple average value of the respective pattern intervals. For example, measurement is repeated in 64 revolutions. The actual measured value of each interval differs from each other at every measurement since rotational jitters of the SPM 14 exist during the measurement of the time interval of the POs. Carrying out measurement plural times to average the measured values enables one to reduce the effect of the rotational jitter of the SPM 14 in PO time interval measurement. $T_{avg}[k]$ denotes an average time from a pattern PO[k] to a pattern PO[k+1]. $T_{avg}[N-1]$ denotes an average time from a pattern PO[N31 1] to the pattern PO[0]. A time $T_{total}$ of the average time for a circuit is expressed by the following formula:

$$T_{total}=T_{avg}[0]+T_{avg}[1]+\ldots+T_{avg}[N-1]$$

The time $T_{total}$ is a time (the clock count number) measured with the default clock frequency f0.

The HDC/MPU 23 then calculates an integer M so that N×M would be closest to $T_{total}$. As for M, defined is:

$$(N\times M)/T_{total}=1+C\_\text{factor}.$$

The integer M is preferably determined as described above for the purpose of reducing the degree of change in clock frequency. This is, however, not a unique selection of the numerical value so long as the integer M is within a range capable of changing the clock frequency in the clock generation circuit 211.

The clock generation circuit 211 may precisely change clock frequency based on the control signal from the HDC/MPU 23 as described above. The HDC/MPU 23 gives a control signal for changing the clock frequency in the clock generation circuit 211 by a quantity of C_factor. That is to say, new frequency f1 may be expressed by (1+C_factor)×f0 since the default frequency is f0. C_factor is a positive or a negative number in the vicinity of 0.

The integer M and the frequency f1 enable a track to be equally divided into the number of N. That is to say, it becomes possible to determine even pattern interval of the patterns PE to be newly written on the outer radial side (target pattern interval). In the case of the default frequency f0, there is a fraction when the count number of a track is not multiples of N, so that all pattern intervals cannot be equally determined. In order to remedy this situation, $T_{total}$ is used to determine the clock frequency f1 for equally dividing one revolution of the track into the number of N and the count number M of the respective intervals for the effect of the rotational jitter of SPM 14 to be eliminated.

Further, the frequency is changed by C_factor, that is, the clock having the clock frequency f1 is used while the HDC/MPU 23 measures again time intervals of the N patterns PO (number of the clock count between the sector patterns). Similarly, in order to eliminate the effect of the rotational jitters of the SPM 14, calculated is a simple average value of the values measured for plural revolutions of the disk. $D_{avg}[k]$ denotes an average time (number of clock count) from the pattern PO[k] to the pattern PO[k+1].

$D_{avg}[N-]$ denotes an average clock count number from the pattern PO[N−1] to the pattern PO[0]. An average of sufficient times of measurements is expressed as follows:

$$N \times M = D_{avg}[0] + D_{avg}[1] + \ldots + D_{avg}[N-1].$$

Under the above condition, the HDC/MPU 23 performs calculation of $$D_{target}[k] = D_{avg}[0] + D_{avg}[1] + \ldots + D_{avg}[k-1]$$

wherein $D_{target}[k]$ denotes a target time value of the pattern of sector k (Sector[k]) measured from sector 0.

That is to say, the target time value $D_{target}$ is a target value of time for reading the respective patterns PO on the inner radial side in the process of writing the patterns PE on the outer radial side. For example, the outer radial patterns PE[k] are written in predetermined time after reading the inner radial side patterns PO[k]. $D_{target}[k]$ is the target value of the time for reading out the patterns PO[k]. $D_{target}[k]$ corresponds to a detecting time value of the pattern PO[k] measured with a clock frequency f1 in the case of no rotational jitter of the SPM 14 (in the case of removing the effect of the jitters) since $D_{target}[k]$ is a total count of the average values of the time intervals between the respective patterns from the pattern in the sector 0 to the pattern in the sector k. The reference of the detecting time value is, of course, detection timing of the pattern PO[0].

Subsequent to the above described step, as shown in S13, written are the outer radial side patterns PE with reading the inner radial side patterns PO as a reference. The outer radial side patterns PE[k] are written after a delay time (Delay[k]) from the time of reading the inner radial side patterns PO[k]. Delay [k] is determined for every sector and expressed by the following formula:

$$Delay[k] = Delay[0] + k \times M - D_{target}[k],$$

wherein Delay[0] is a value determined in designing, since the outer radial side patterns PE are written at even intervals (the count number M with the clock frequency f1: M@f1) while intervals of the inner radial side patterns PO are not equally spaced.

If the rotational jitter of the SPM 14 does not exist, it is possible to write the outer radial side patterns PE[k] at even intervals on the track TE after the delay time Delay[k] has passed from the timing of detecting the respective patterns PO[k] using a fixed clock frequency of f1. Similar to the case of measuring the pattern intervals of the inner radial side reference patterns PO, the rotational jitters of the SPM 14 also exist in the case of writing new patterns PE on the outer radial side. In order to compensate for the effect of the jitters, the clock frequency is changed to follow the rotational jitters of the SPM 14.

In more detail, clock generation circuit 211 changes the frequency f[k] at every sector under the control of the HDC/MPU 23. $D_{stamp}$ denotes actual detecting time of the respective inner radial side patterns PO. For example, $D_{stamp}[k]$ denotes the actual detecting time of the patterns PO[k] in the sector k. Adjustment of the clock frequency f[k] is performed to keep $D_{stamp}[k]$ to be $D_{target}[k]$.

The control of the frequency is done by feedback to the clock frequency expressed by the following formula:

$$D_{error}[k] = D_{stamp}[k] - D_{target}[k],$$

$$Sum_{error} = Sum_{error} + D_{error}[k], \text{ and}$$

$$C\_factor[k] = kp \times D_{error}[k] + ki \cdot Sum_{error} + kd \times (D_{error}[k] - D_{error}[k-1]).$$

Using this C_factor[k] the clock frequency f[k] in the sector k is expressed by the formula of $$f[k] = (1 + C\_factor[k]) \times f1.$$

As in the above formulas, the frequency adjustment factor C_factor[k] is determined by the PID control based on the difference between the target time $D_{target}$ of the inner radial side reference patterns PO and the measurement time $D_{stamp}$ thereof. That is to say, the frequency changing factor C_factor [k] is expressed as a sum of the difference $D_{error}[k]$ between the actual measured time $D_{stamp}[k]$ of the pattern PO[k] and the target time $D_{target}[k]$ (a proportional component), an integration of $D_{error}$ up to that sector (an integral component) and a differential of $D_{error}$ between the sector k and the sector (k−1) (a differential component). Appropriate values are assigned to the coefficients kp, ki and kd at the design of each product. As described above, correcting the clock frequency at the respective sectors by the PID control enables the rotational jitters of the SPM 14 to be compensated, so that the actual measured time value $D_{stamp}[k]$ at inner radial side patterns PO keeps a value close to $D_{target}[k]$ at each sector k.

When the high-speed PID control is possible, timing for writing the respective patterns PE[k] on the outer radial side track TE is determined using the clock having the clock frequency f[k] (Delay[k]@f[k]), as shown in FIG. 6. On the other hand, the clock frequency f[k] is used in writing a pattern subsequent to PE[k] when the PID control requires a certain amount of time, but this does not cause a serious problem in the control. The outer radial side patterns PE are preferably written after plural sectors or plural revolutions of a track from the start of reading of the inner radial side reference patterns PO under the PID control. That is to say, writing of a set of patterns on the outer side track is started after reading the plural sector patterns on the inner radial side track TO with PID control of the clock frequency being carried out, because the actual measured time value $D_{stamp}[k]$ would be far from the target time value $D_{target}[k]$ at the start of the control, and a certain period of time after starting reading is necessary until the control becomes stable.

Figure 7:
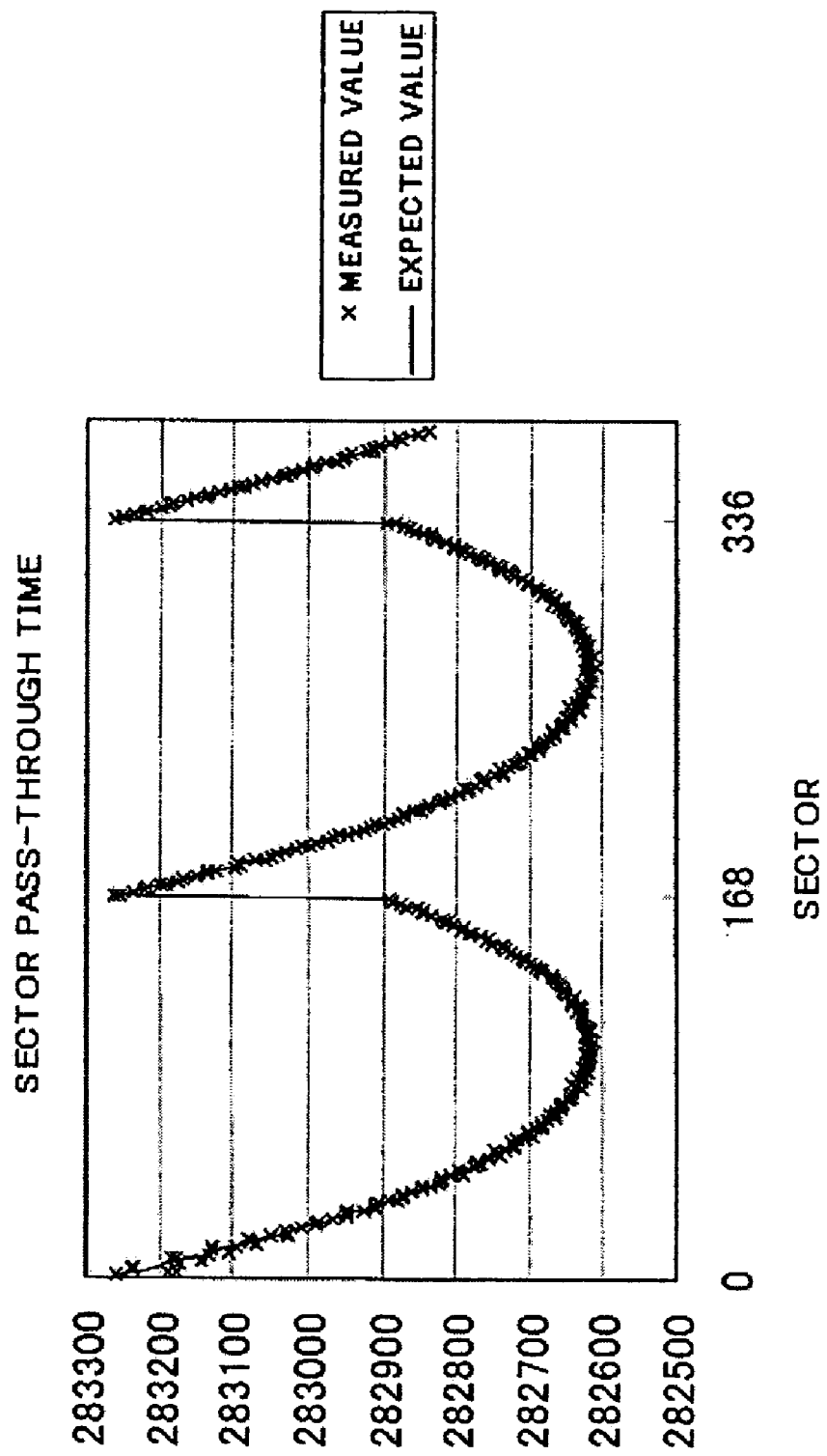
FIG. 7 illustrates an example of writing a pattern based on PID control in the embodiment, and shows a relation between a detecting time and a target time in the case where patterns on the initial pattern (PO) are read out plural times while the PID control is performed.

FIG. 7 illustrates an example of the timing control in an HDD with 168 sectors per one revolution under the above-mentioned PID control. FIG. 7 shows the measured time ($D_{stamp}[k]$) and the target time ($D_{target}[k]$) while the read head device is located on the track PO and reads the sector pattern TO for plural revolutions with the PID control being performed. In a graph in FIG. 7, X axis denotes a sector number counted from the start of the control, and Y axis denotes measured and target time values($D_{stamp}[k]$ and $D_{target}[k]$). 168 sectors compose one revolution, and the result of the measurement for almost 2.5 revolutions is shown in FIG. 7. As shown in FIG. 7, there is a difference between measured time value and the target time value at the start of the control, and the difference becomes negligibly small after around 10 sectors have passed from the start of the control, which indicates the clock frequency is controlled so that the measured time value would follow the target time value. Thus, adjusting the clock frequency by C_factor[k] for every sector in the PID control enables measured time value to be target time value at each sector of PO even in the case where the rotational jitter of the SPM 14 exists.

The clock frequency may be changed by means of PI control or other control although the change of the clock frequency is preferably carried out by the PID control as described above. For example, the clock frequency is adjusted with the adjusting component C_factor[k] expressed by the following formula:

$$C\_factor[k] = (D_{stamp}[k] - D_{stamp}[k-L])/(D_{target}[k] - D_{target}[k-L]) - 1,$$

wherein L denotes a natural number determined in designing. 10 or 20, for example, may be selected for L. In the above embodiment, a simple sum of plural consecutive sector intervals is used for the purpose of removing the rotational jitters of the magnetic disk 11. Another operating method such as weighting average of plural measured values, for example, may be used.

In the above-mentioned embodiment, a set of reference patterns written at uneven intervals is used to write a set of new patterns at even intervals. The above-mentioned clock frequency control, however, may be used for writing a set of patterns at even intervals on the basis of a set of reference patterns written at even intervals. The above-mentioned control method may be used in a self-propagation sequence of a product servo pattern (a process of writing a product servo pattern on the basis of a product servo pattern), for example. In this case, a delay time from the time of reading out the reference pattern to the time of writing a new pattern is the same in all sectors.

A sector interval is measured with a clock of the R/W channel 21 to adjust the clock frequency so as to adjust a difference between the measured value and an expected value, and thereby, the clock is always synchronized with the rotational jitters of the SPM 14. Writing subsequent patterns on the basis of the clock under the condition that the clock is synchronized with the rotation of the SPM 14 enables product servo patterns having the same phase with adjacent track to be written.

Specific embodiments of the invention have been exemplified above. The invention, however, is not limited to the above embodiments. A person skilled in the art may easily change, add and/or modify each of the elements in the embodiments within the scope of the invention. The invention may be also applicable to a data storage device using another type of media other than a magnetic disk apparatus. The invention is specifically useful for self-writing a servo pattern, but may be applicable to self-writing of other patterns.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method for reading a pattern by a read device associated with writing a new pattern by a write device provided at a different radial location than a read device in a rotating media, the method comprising:

writing plural reference patterns on plural sectors of a first track of the rotating media;

determining a read time value of each reference pattern by measuring a read time between reference patterns for each of the plural reference patterns plural times;

determining a target time value based on the determined read time value;

changing a clock frequency based on a difference between the read time value of each of the respective reference patterns and the determined target time value simultaneously with reading out the plural reference patterns; and writing a new pattern on a second track with the changed clock frequency after a delay time obtained for each sector has passed from the read time of the respective reference patterns.

2. The method according to claim 1, wherein changing the clock frequency comprises:

changing the clock frequency based on the difference between the read time value of each of the respective reference pattern and the target time value.

3. The method according to claim 1, further comprising:

calculating a read time value of each of the reference patterns by compensating for the effect of rotational jitter of the media on the basis of the measured read time values of each of the reference patterns plural read times; and determining the read time value as a target value of the reference pattern.

4. The method according to claim 3, further comprising:

determining a simple average value of the measured plural read time values of each reference pattern as the target time value.

5. The method according to claim 1, wherein a value of the clock frequency for carrying out the measurement of the plural reference patterns is a value that a total number of clock count for one revolution of a track with the clock frequency can be equally divided by the number of patterns written on the second track.

6. The method according to claim 5, further comprising:

determining the measuring clock frequency based on plural measured values of the total number of clock counts in one revolution of the first track with a reference clock frequency and on the number of clock counts between the patterns written on the second track.

7. The method according to claim 6, wherein the reference clock frequency is the clock frequency used to write the plural reference patterns on the first track.

8. A data storage device comprising:

a read device to read plural times each of plural reference patterns written on plural sectors of a first track in a rotating media;

a controller to determine a target time value corresponding to plural read time values of each of the plural reference patterns read out by the read device;

a clock generation circuit to generate a clock of a frequency controlled by using a difference between the read time value of each of the reference patterns and the target time value thereof; and a write device to write a new pattern on a second track with the controlled clock frequency after a delay time obtained for each sector has passed after reading the respective reference patterns.

9. The data storage device according to claim 8, wherein the clock generation circuit changes the clock frequency based on a difference between the read time value of each of the respective reference patterns and the target time value.

10. The data storage device according to claim 8, wherein the controller calculates a read time value of each of the reference patterns by compensating for the effect of rotating jitter of the media on the basis of the plural read time values, read by the read device, of each of the reference patterns, and determines the resulting time value as a target time value of the reference pattern.

11. The data storage device according to claim 10, wherein a value of the clock frequency to carry out reading of the plural reference patterns by the read device is a value with which a total number of clock count in one revolution of a track is equally divided by the number of patterns written on the second track.

12. The data storage device according to claim 11, wherein the controller determines the measuring clock frequency based on plural measured values of the number of clock counts for one revolution of the first track with a reference clock frequency and on the number of clock counts between the patterns written on the second track.

13. The data storage device according to claim 12, wherein the reference clock frequency is the clock frequency used to write the plural reference patterns on the first track.

14. The data storage device according to claim 8, wherein the controller determines an average value of the plural read time values, read by the read device, of each of the reference patterns as the target value.

15. An apparatus for reading a pattern by a read device associated with writing a new pattern by a write device provided at a different radial location than a read device in a rotating media, in which plural reference patterns are written on a first track of the rotating media, the apparatus comprising:

means for determining a target time value relative to a read time value of a reference pattern by measuring a read time value between of each of the plural reference patterns plural times;

means for changing a clock frequency based on a difference between the read time value of each of the respective reference patterns and the determined target time value simultaneously with reading out the plural reference patterns; and means for writing a new pattern on a second track with the changed clock frequency after a delay time obtained for each sector has passed from the read time of the respective reference patterns.

16. The apparatus according to claim 15, further comprising:

means for calculating a read time value of each of the reference patterns by compensating for the effect of rotational jitter of the media on the basis of the measured read time values of each of the reference patterns plural read times; and means for determining the read time value as a target value of the reference pattern.

17. The apparatus according to claim 16, further comprising:

means for determining a simple average value of the measured plural read time values of each reference pattern as the target time value.

18. The apparatus according to claim 15, wherein a value of the clock frequency for carrying out the measurement of the plural reference patterns is a value that a total number of clock count for one revolution of a track with the clock frequency can be equally divided by the number of patterns written on the second track.

19. The apparatus according to claim 18, further comprising:

means for determining the measuring clock frequency based on plural measured values of the total number of clock counts in one revolution of the first track with a reference clock frequency and on the number of clock counts between the patterns written on the second track.

20. The apparatus according to claim 19, wherein the reference clock frequency is the clock frequency used to write the plural reference patterns on the first track.

* * * * *

UNITED STATES PATENT AND TRADEMARK OFFICE
CERTIFICATE OF CORRECTION

PATENT NO. : 7,532,424 B2 Page 1 of 1
APPLICATION NO. : 11/494684
DATED : May 12, 2009
INVENTOR(S) : Sai et al.

It is certified that error appears in the above-identified patent and that said Letters Patent is hereby corrected as shown below:

Column 10, line 8, please delete "bitter)" and insert -- (jitter) --

Signed and Sealed this

Fourteenth Day of July, 2009

JOHN DOLL
*Acting Director of the United States Patent and Trademark Office*